(12) United States Patent
Meysami et al.

(10) Patent No.: US 12,378,410 B2
(45) Date of Patent: Aug. 5, 2025

(54) POLYAMIDE COMPOSITION AND A TUBULAR OR PIPE MULTILAYER STRUCTURE COMPRISING THE SAME

(71) Applicant: BASF SE, Ludwigshafen am Rhein (DE)

(72) Inventors: Mohammad Meysami, Budd Lake, NJ (US); Gijsbrecht Jacobus Maria Habraken, Ludwigshafen (DE); Stephen J. Hanley, Budd Lake, NJ (US)

(73) Assignee: BASF SE, Ludwigshafen am Rhein (DE)

( * ) Notice: Subject to any disclaimer, the term of this patent is extended or adjusted under 35 U.S.C. 154(b) by 789 days.

(21) Appl. No.: 17/608,671

(22) PCT Filed: May 4, 2020

(86) PCT No.: PCT/EP2020/062243
§ 371 (c)(1),
(2) Date: Nov. 3, 2021

(87) PCT Pub. No.: WO2020/225176
PCT Pub. Date: Nov. 12, 2020

(65) Prior Publication Data
US 2022/0204763 A1    Jun. 30, 2022

Related U.S. Application Data

(60) Provisional application No. 62/844,803, filed on May 8, 2019.

(30) Foreign Application Priority Data

May 31, 2019 (EP) .................................... 19177559

(51) Int. Cl.
C08L 77/02 (2006.01)
F16L 11/04 (2006.01)

(52) U.S. Cl.
CPC ............... *C08L 77/02* (2013.01); *F16L 11/04* (2013.01); *C08L 2203/18* (2013.01); *C08L 2203/30* (2013.01); *C08L 2205/025* (2013.01)

(58) Field of Classification Search
CPC ....................................................... C08L 77/02
See application file for complete search history.

(56) References Cited

U.S. PATENT DOCUMENTS

| | | | |
|---|---|---|---|
| 5,256,460 A | 10/1993 | Yu | |
| 6,060,562 A | 5/2000 | Guaita et al. | |
| 8,153,215 B1 | 4/2012 | Peduto et al. | |
| 2003/0232962 A1 | 12/2003 | Scholl et al. | |
| 2008/0070023 A1 | 3/2008 | Topoulos | |
| 2014/0323631 A1 | 10/2014 | Gabriel et al. | |
| 2015/0247025 A1 | 9/2015 | Ichikawa et al. | |
| 2016/0195963 A1 | 7/2016 | Esaka et al. | |
| 2018/0282496 A1 | 10/2018 | Nakano et al. | |
| 2020/0190367 A1 | 6/2020 | Matz et al. | |

FOREIGN PATENT DOCUMENTS

| | | | | |
|---|---|---|---|---|
| CN | 1200754 | | 12/1998 | |
| EP | 0436923 B2 | | 3/2000 | |
| KR | 10-2015-0075837 | | 7/2015 | |
| WO | WO-2016053965 A1 * | | 4/2016 | ............. C08L 77/06 |
| WO | 2019/007747 | | 1/2019 | |
| WO | 2019/057849 | | 3/2019 | |

OTHER PUBLICATIONS

Brazilian Search Report and Written Opinion dated Sep. 4, 2023, in Brazilian Application No. 112021022143-3, 4 pages.
European Search Report for EP Patent Application No. 19177559.2, Issued on Nov. 25, 2019, 3 pages.
International Search Report and Written Opinion for corresponding PCT/EP2020/062243 mailed Jul. 29, 2020, 8 Pages.
Chinese Office Action dated Jun. 16, 2023, in Chinese Application No. 202080034099.0, 8 pages.
Indian Office Action dated Feb. 15, 2023, in Indian Application No. 202127047882, with English translation, 5 pages.
Japanese Office Action received for Japanese Patent Application No. 2021-566190, issued on Sep. 11, 2024, 9 pages with English translation.

* cited by examiner

*Primary Examiner* — Michael F Pepitone
(74) *Attorney, Agent, or Firm* — Baltazar Gomez

(57) ABSTRACT

Described herein is a polyamide composition and a tubular or pipe multilayer structure including the same.

15 Claims, No Drawings

POLYAMIDE COMPOSITION AND A TUBULAR OR PIPE MULTILAYER STRUCTURE COMPRISING THE SAME

CROSS-REFERENCE TO RELATED APPLICATIONS

This application is a U.S. National Phase Application of International Patent Application No. PCT/EP2020/062243, filed May 4, 2020, which claims priority to U.S. Provisional Patent Application No. 62/844,803, filed May 8, 2019, and which also claims priority to European Patent Application No. 19177559.2, filed May 31, 2019, the entire contents of which are hereby incorporated by reference herein.

FIELD OF INVENTION

The present invention relates to a polyamide composition and a tubular or pipe multilayer structure comprising the same.

BACKGROUND OF THE INVENTION

Environmental stress cracking (ESC) is the formation of cracks in a material caused by relatively low tensile stress and environmental conditions. Environmental stress cracking resistance (ESCR) is a vital property required in plastics for its longevity. It is one of the most common causes of unexpected brittle failure in polymers, particularly thermoplastics.

Tubes or pipes carrying fluids, particularly for transporting liquid fluids such as alcohol and liquid fuel, require improved barrier properties with respect to these fluids and good properties of flexibility and resistance to environment conditions.

It is known that compositions comprising polyhexamethyleneadipamide (PA 66) or polycaprolactam (PA 6) are not suitable for the production of tubes or pipes. This is because these polymers do not exhibit resistance to saline solutions, such as zinc chloride ($ZnCl_2$) solution. Such a resistance is required by automobile manufacturers and is defined by International Standards such as SAE J844 for airbrake tubings. In brief, this test consists of determining the resistance of the material to cracking or splitting, when the material is immersed in the saline solution, particularly $ZnCl_2$, with application of flexural force. Thus, a pipe made of PA 66 or PA 6, immersed in $ZnCl_2$ solution and placed under mechanical stress, splits and even bursts in a few minutes.

To overcome this problem, provision has been made to use polyamides obtained from monomers with a higher number of carbon atoms, namely 11 or 12. These polyamides, although, exhibit an improved resistance to $ZnCl_2$ test, but have a limited impact strength at ambient temperature and a high manufacturing cost.

Polyamide compositions for hot melt adhesive are described in US 2003/0232962 A1. The polyamide composition described here includes the reaction product of dimer acid (e.g. a dimer acid including at least 98% by weight dimer), caprolactam, hexamethylene diamine, sebacic acid, and optionally, chain terminating agent.

U.S. Pat. No. 5,256,460 A describes a thermoplastic composition comprising a mixture of a thermoplastic copolymer with a polyolefin comprising grafted functional groups. The thermoplastic copolymer obtained by copolymerization of ε-caprolactam with amino acid monomers or their lactams comprising at least 9 carbon atoms or a mixture of hexamethylenediamine and dicarboxylic acid monomers comprising at least 9 carbon atoms.

U.S. Pat. No. 6,060,562 A describes another thermoplastic composition comprising a matrix made of thermoplastic polymer and at least one compound which improves the resilience of thermoplastic compositions. The matrix comprises a mixture of a first thermoplastic comprising a copolymer of ε-caprolactam and at least one of an amino acid comprising at least 9 carbon atoms, a lactam corresponding to the amino acid comprising at least 9 carbon atoms, or a mixture of hexamethylenediamine with a diacid comprising at least 9 carbon atoms having a ratio of weight % of ε-caprolactam to weight % of hexamethylenediamine and diacid mixture of 4 to 9; and a second thermoplastic comprising a polyamide or copolyamide of monomers comprising less than 9 carbon atoms, and the content of the second thermoplastic in the matrix is 40 to 80 weight % of the matrix and greater than 20 weight % of the overall composition.

Another U.S. Pat. No. 8,153,215 B1 discloses a multilayer structure comprising two superposed layers: an internal layer and an external layer. The internal layer comprises a thermoplastic polyamide and an agent modifying resistance to shocks in a weight proportion between 10 and 50%, while the external layer is based on a composition containing as polymeric matrix a polyamide composition selected from a thermoplastic copolymer obtained by copolymerization of 6-caprolactam with at least one of the monomers selected from an amino acid containing at least 9 carbon atoms or the corresponding lactam, a mixture of hexamethylenediamine with a diacid comprising at least 9 carbon atoms, the weight ratio between the ε-caprolactam and the hexamethylenediamine and diacid and/or amino acid ranging between 4 to 9, or a mixture of at least said thermoplastic polyamide or copolyamide obtained by polymerization of monomers containing less than 9 carbon atoms.

Despite the above, the existing polyamide compositions and the tubes or pipes obtained therefrom are unable to provide acceptable $ZnCl_2$ resistance in accordance with SAE J844. Oftenly, in meeting the requirements of SAE J844, the existing tubes or pipes compromise on mechanical properties, such as but not limited to, flexural modulus, tensile modulus and elongation at break. This renders them unsuitable for applications, such as but not limited to, air brake tube, air conditioning tube, pneumatic pipe and fuel pipe. Further, the existing compositions also result in delamination in the multilayer tube or pipe structure due to insufficient adhesion therebetween. This, in turn, results in short lifespan of the tube or pipe structure. Furthermore, the presence of long chain polyamides in these compositions either increases the overall cost of the resulting tube or pipe or results in supply issues due to their unavailability.

It was, therefore, an object of the presently claimed invention to provide a polyamide composition and a tubular or pipe multilayer structure comprising the same which is capable of meeting the requirement of stress cracking resistance measured in $ZnCl_2$ solution in accordance with SAE J844 for 200 h duration, has acceptable mechanical properties, such as but not limited to, flexural modulus, tensile modulus and elongation at break without any delamination, thereby rendering it suitable for producing inexpensive air brake tube, air conditioning tube, pneumatic pipe and fuel pipe.

SUMMARY OF THE INVENTION

Surprisingly, it has been found that the above object is met by providing a polyamide composition comprising a polyamide copolymer obtained by reacting (i) ε-caprolactam, and (ii) a mixture of hexamethylenediamine with a diacid comprising at least 9 carbon atoms, wherein the weight ratio between (i) and (ii) is in between 1.0:1.0 to 3.0:1.0, as described hereinbelow.

Accordingly, in one aspect, the presently claimed invention is directed to a polyamide composition comprising:
(a) a polyamide copolymer obtained by reacting
  (i) ε-caprolactam, and
  (ii) a mixture of hexamethylenediamine with a diacid comprising at least 9 carbon atoms, wherein the weight ratio between (i) and (ii) is in between 1.0:1.0 to 3.0:1.0,
(b) at least one polyamide which is different from (a),
(c) at least one impact modifier, and
(d) additives.

In another aspect, the presently claimed invention is directed to a process for preparing the above polyamide composition by mixing the polyamide copolymer (a), the polyamide (b), the impact modifier (c) and the additives (d).

In still another aspect, the presently claimed invention is directed to a shaped article comprising the above polyamide composition.

In yet another aspect, the presently claimed invention is directed to the use of the above polyamide composition for a shaped article.

In a further aspect, the presently claimed invention is directed to a tubular or pipe multilayer structure comprising an innermost layer, a middle layer and an outermost layer, wherein the innermost layer and the outermost layer, independent of one another, comprises:
(a) a polyamide copolymer obtained by reacting
  (i) ε-caprolactam, and
  (ii) mixture of hexamethylenediamine with a diacid comprising at least 9 carbon atoms, wherein the weight ratio between (i) and (ii) is in between 1.0:1.0 to 3.0:1.0, wherein the middle layer comprises
(b) at least one polyamide which is different from (a), and
wherein at least one impact modifier (c) and additives (d) are present in at least one of the innermost layer, the middle layer and the outermost layer.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

Moreover, the phrases "$ZnCl_2$ resistance" and "ESCR resistance" throughout the description refer to the stress cracking resistance measured in $ZnCl_2$ solution in accordance with SAE J844 for 200 h duration.

An aspect of the present invention is embodiment 1, directed to a polyamide composition comprising:
(a) a polyamide copolymer obtained by reacting
  (i) ε-caprolactam, and
  (ii) a mixture of hexamethylenediamine with a diacid comprising at least 9 carbon atoms, wherein the weight ratio between (i) and (ii) is in between 1.0:1.0 to 3.0:1.0,
(b) at least one polyamide which is different from (a),
(c) at least one impact modifier, and
(d) additives.

The inventive composition of the embodiment 1 shows acceptable $ZnCl_2$ resistance and mechanical properties such as, but not limited to, flexural modulus, tensile modulus and elongation at break.

Polyamide Copolymer (a)

In one embodiment, the diacid comprises 9 to 40 carbon atoms in the embodiment 1. In the present context, the diacid comprising 9 to 40 carbon atoms includes aliphatic and/or aromatic compounds which are saturated or unsaturated, having 7 to 38 carbon atoms and two carboxy groups (—COOH groups). Thus, the diacid comprising 9 to 40 carbon atoms may be branched or unbranched or cycloaliphatic. For example, the diacids can be selected from azelaic acid, sebacic acid, undecanedioic acid, dodecanedioic acid, tridecandioic acid, tetradecanedioic acid and hexadecanedioic acid.

In another embodiment, the diacid comprises 32 to 40 carbon atoms in the embodiment 1. In the present context, the diacid comprising 32 to 40 carbon atoms can also be referred to as "$C_{32}$ to $C_{40}$ diacid" or "$C_{32}$ to $C_{40}$ dimer acid" or "$C_{32}$ to $C_{40}$ dimer fatty acid". $C_{32}$ to $C_{40}$ dimer acids are known to the person skilled in the art and are usually prepared by dimerization of unsaturated fatty acids. This dimerization can be catalysed, for example, by clays. Suitable unsaturated fatty acids for obtaining the $C_{32}$ to $C_{40}$ dimer acid include, for example, unsaturated $C_{16}$ fatty acids, unsaturated $C_{18}$ fatty acids and unsaturated $C_{20}$ fatty acids.

In yet another embodiment, the diacid comprising 32 to 40 carbon atoms in the embodiment 1 is prepared from unsaturated fatty acids selected from the group consisting of unsaturated $C_{16}$ fatty acids, unsaturated $C_{18}$ fatty acids and unsaturated $C_{20}$ fatty acids, particular preference being given to the unsaturated $C_{18}$ fatty acids.

In one embodiment, suitable unsaturated $C_{16}$ fatty acid is palmitoleic acid ((9Z)-hexadeca-9-enoic acid).

In one embodiment, suitable unsaturated $C_{20}$ fatty acids are selected from gadoleic acid ((9Z)-eicosa-9-enoic acid), eicosenoic acid ((11Z)-eicosa-11-enoic acid), arachidonic acid ((5Z,8Z,11Z,14Z)-eicosa-5,8,11,14-tetraenoic acid) and timnodonic acid ((5Z,8Z,11Z,14Z,17Z)-eicosa-5,8,11,14,17-pentaenoic acid).

In another embodiment, the diacid comprises 36 carbon atoms in the embodiment 1. Particularly, the diacid comprises a $C_3$ dimer acid in the embodiment 1. The $C_3$ dimer acid is prepared starting from unsaturated $C_{18}$ fatty acid. Such unsaturated $C_{18}$ fatty acids are selected from petrosilinic acid ((6Z)-Octadecenoic acid), oleic acid ((9Z)-Octadec-9-enoic acid), elaidic acid ((E)-octadec-9-enoic acid), vaccenic acid ((11E)-Octadec-11-enoic acid), linoleic acid ((9Z,12Z)-octadeca-9,12-dienoic acid), α-linolenic acid ((9Z,12Z,15Z)-octadeca-9,12,15-trienoic acid), γ-linolenic acid ((6Z, 9Z, 12Z)-octadeca-6,9,12-trienoic acid), calendic acid ((8E,10E,12Z)-octadeca-8,10,12-trienoic acid), punicic acid (9Z,11E,13Z-octadeca-9,11,13-trienoic acid), α-eleostearic acid ((9Z,11E,13E)-Octadeca-9,11,13-trienoic acid) and β-eleostearic acid ((9E,11E,13E)-Octadeca-9,11,13-trienoic acid).

In one embodiment, the preparation of diacids from unsaturated fatty acids, trimer acids may additionally form; residues of unreacted unsaturated fatty acid may also remain. The formation of trimer acids is known to those skilled in the art.

In one embodiment, the unsaturated $C_{18}$ fatty acid is selected from petrosilinic acid ((6Z)-Octadecenoic acid), oleic acid ((9Z)-Octadec-9-enoic acid), elaidic acid ((E)-octadec-9-enoic acid), vaccenic acid ((11E)-Octadec-11-enoic acid) and linoleic acid ((9Z,12Z)-octadeca-9,12-dienoic acid).

In another embodiment, the diacids in the embodiment 1 refer to mixtures that are prepared by oligomerization of unsaturated fatty acids. They are prepared, for example, by catalytic dimerization of unsaturated fatty acids from vegetable sources, in which case the starting materials used are especially unsaturated $C_{16}$ to $C_{20}$ fatty acids. The addition is primarily of the Diels-Alder type, and the result, according to the number and position of the double bonds in the fatty acids used for preparation of the dimer acids, is mixtures of primarily dimeric products having cycloaliphatic, linear aliphatic, branched aliphatic and also $C_6$-aromatic hydrocarbyl groups between the carboxyl groups. According to the mechanism and/or any subsequent hydrogenation, the aliphatic radicals may be saturated or unsaturated, and the proportion of aromatic groups may also vary. The radicals between the carboxylic acid groups in that case comprise, for example, 32 to 40 carbon atoms. Preference is given to using fatty acids having 18 carbon atoms for the preparation, such that the dimeric product thus has 36 carbon atoms. In one embodiment, the radicals that connect the carboxyl groups of the diacids do not have any unsaturated bonds or any aromatic hydrocarbyl radicals.

In one embodiment, $C_{18}$ fatty acids selected from linolenic acid, linoleic acid and/or oleic acid are used to prepare the diacids in the embodiment 1.

In one embodiment, depending on the reaction regime, the oligomerization described above gives rise to mixtures comprising mainly dimeric molecules, but also trimeric molecules and also monomeric molecules and other by-products. Purification is typically by distillative means. Commercial dimer acids generally comprise at least 80% by weight of dimeric molecules, up to 19% by weight of trimeric molecules and not more than 1% by weight of monomeric molecules and other by-products.

In one embodiment, the dimer acids consist of dimeric fatty acid molecules to an extent of at least 90% by weight, preferably to an extent of at least 95% by weight, even more preferably to an extent of at least 98% by weight. The proportions of monomeric, dimeric and trimeric molecules and other by-products in the dimer acids can be determined, for example, by means of gas chromatography (GC). The dimer acids here, prior to the GC analysis, are converted to the corresponding methyl esters via the boron trifluoride method (cf. DIN EN ISO 5509) and then analyzed by means of GC.

In one embodiment, the preparation of diacids in the embodiment 1 comprises the oligomerization of unsaturated fatty acids. This oligomerization gives rise primarily to dimeric products upto an extent of at least 80% by weight, or 90% by weight, or 95% by weight, or 98% by weight. The fact that the oligomerization thus gives rise predominantly to dimeric products comprising exactly two fatty acid molecules justifies this name, which is in common use in any case.

In another embodiment, the dimer acids are also obtainable as commercial products. Examples of these include Radiacid® from Oleon, Pripol™ from Croda, Empol® from BASF SE, and Unidyme™ from Arizona Chemical.

In another embodiment, the polyamide copolymer (a) is obtained by reacting (i) ε-caprolactam with (ii) the mixture of hexamethylenediamine with diacid comprising 36 carbon atoms, wherein the weight ratio between (i) and (ii) is in between 1:1 to 3:1.

In one embodiment, the weight ratio between (i) and (ii) in the embodiment 1, as described herein, is in between 1.1:1.0 to 3.0:1.0, or 1.2:1.0 to 3.0:1.0, or 1.3:1.0 to 3.0:1.0, or 1.4:1.0 to 3.0:1.0, or 1.5:1.0 to 3.0:1.0. In other embodiment, the weight ratio is in between 1.6:1.0 to 3.0:1.0, or 1.7:1.0 to 3.0:1.0, or 1.8:1.0 to 3.0:1.0, or 1.9:1.0 to 3.0:1.0, or 2.0:1.0 to 3.0:1.0. In another embodiment, the weight ratio is in between 2.0:1.0 to 2.9:1.0, or 2.0:1.0 to 2.8:1.0, or 2.0:1.0 to 2.7:1.0, or 2.0:1.0 to 2.6:1.0, or 2.0:1.0 to 2.5:1.0. In another embodiment, the weight ratio is in between 2.1:1.0 to 2.5:1.0, or 2.2:1.0 to 2.5:1.0, or 2.2:1.0 to 2.4:1.0. In still another embodiment, the weight ratio is in between 2.25:1.0 to 2.4:1.0, or 2.25:1.0 to 2.35:1.0.

In a further embodiment, the weight ratio between (i) and (ii) in the embodiment 1, as described herein, is 2.3:1.0. The ratio of 2.3:1.0 corresponds to 30 wt.-% of (ii) and 70 wt.-% of (i) in the embodiment 1, as described herein.

In one embodiment, the reaction between (i) and (ii) in the embodiment 1 is carried out at a temperature in between 250° C. to 350° C. The reaction can be carried out in a suitable mixing means known to the person skilled in the art. The polyamide copolymer (a), thus obtained, has a viscosity number in between 150 to 350 ml/g. The viscosity number is determined from a 0.5 wt.-% solution of the polyamide copolymer (a) in 96 wt.-% sulfuric acid at 25° C. according to ISO 307.

In another embodiment, the amount of the polyamide copolymer (a), as described herein, is in between 40 wt.-% to 90 wt.-% based on the total weight of the polyamide composition, as described herein.

Polyamide (b)

In one embodiment, the polyamide (b) is different than the polyamide copolymer (a). In other embodiment, the polyamide (b) in the embodiment 1 has the viscosity number in between 90 ml/g to 350 ml/g. In the present context, the viscosity number is determined from a 0.5 wt.-% solution of the polyamide (b) in 96 wt.-% sulfuric acid at 25° C. according to ISO 307.

Suitable polyamides (b) in the embodiment 1 are, for example, derived from lactams having 7 to 13 ring members or obtained by reaction of dicarboxylic acids with diamines. Examples of polyamides which are derived from lactams include polycaprolactam, polycaprylolactam and/or polylaurolactam.

In other embodiment, suitable polyamides further include those obtainable from w-aminoalkyl nitriles, such as but not limited to, aminocapronitrile, which leads to nylon-6. In addition, dinitriles can be reacted with diamine. For example, adiponitrile can be reacted with hexamethylenediamine to obtain nylon-6,6. The polymerization of nitriles is effected in the presence of water and is also known as direct polymerization.

When polyamides obtainable from dicarboxylic acids and diamines are used, dicarboxylalkanes (aliphatic dicarboxylic acids) having 6 to 36 carbon atoms, or 6 to 12 carbon atoms, or 6 to 10 carbon atoms can be employed. Aromatic dicarboxylic acids are also suitable. Examples of dicarboxylic acids include adipic acid, azelaic acid, sebacic acid, dodecanedioic acid and also terephthalic acid and/or isophthalic acid.

Suitable diamines include, for example, alkanediamines having 4 to 36 carbon atoms, or 6 to 12 carbon atoms, in particular having 6 to 8 carbon atoms, and aromatic diamines, for example m-xylylenediamine, di(4-aminophenyl)methane, di(4-aminocyclohexyl)methane, 2,2-di(4-aminophenyl)propane, 2,2-di(4-aminocyclohexyl)propane and 1,5-diamino-2-methylpentane.

In other embodiment, polyamides (b) in the embodiment 1 include polyhexamethylenedipamide, polyhexamethylenesebacamide and polycaprolactam and also nylon-6/6,6, in particular having a proportion of caprolactam units in between 5 wt.-% to 95 wt.-%.

The non-exhaustive list which follows comprises the aforementioned polyamides (b) in the embodiment 1.

AB Polymers:

| PA 4 | Pyrrolidone |
|---|---|
| PA 6 | ε-caprolactam |

-continued

| PA 7 | Enantholactam |
|---|---|
| PA 8 | Caprylolactam |
| PA 9 | 9-aminopelargonic acid |
| PA 11 | 11-aminoundecanoic acid |
| PA 12 | Laurolactam |

AA/BB Polymers:

| PA 4.6 | Tetramethylenediamine, adipic acid |
|---|---|
| PA 6.6 | Hexamethylenediamine, adipic acid |
| PA 6.9 | Hexamethylenediamine, azelaic acid |
| PA 6.10 | Hexamethylenediamine, sebacic acid |
| PA 6.12 | Hexamethylenediamine, decanedicarboxylic acid |
| PA 6.13 | Hexamethylenediamine, undecanedicarboxylic acid |
| PA 12.12 | Dodecane-1,12-diamine, decanedicarboxylic acid |
| PA 13.13 | Tridecane-1,13-diamine, undecanedicarboxylic acid |
| PA 6T | Hexamethylenediamine, terephthalic acid |
| PA 9T | Nonyldiamine, terephthalic acid |
| PA MXD6 | m-xylylenediamine, adipic acid |
| PA 6I | Hexamethylenediamine, isophthalic acid |
| PA 6-3-T | Trimethylhexamethylenediamine, terephthalic acid |
| PA 6.6T | (see PA 6 and PA 6T) |
| PA 6.66 | (see PA 6 and PA 6.6) |
| PA 6.12 | (see PA 6 and PA 12) |
| PA 66.6.610 | (see PA 6.6, PA 6 and PA 6.10) |
| PA 6I.6T | (see PA 6I and PA 6T) |
| PA PACM 12 | Diaminocyclohexylmethane, laurolactam |
| PA 6I.6T.PACM | As PA 6I.6T and diaminodicyclohexylmethane |
| PA 12.MACMI | Laurolactam, dimethyldiaminodicyclohexylmethane, isophthalic acid |
| PA 12.MACMT | Laurolactam, dimethyldiaminodicyclohexylmethane, terephthalic acid |
| PA PDA-T | Phenyldiamine, terephthalic acid |

In one embodiment, polyamide (b) in the embodiment 1 is selected from PA 6, PA 11, PA 12, PA 6.6, PA 6.9, PA 6.10, PA 6.12 and mixtures thereof.

In other embodiment, the polyamide (b) in the embodiment 1 is selected from PA 6, PA 12, PA 6.6, PA 6.10 and PA 6.12.

In yet other embodiment, the polyamide (b) in the embodiment 1 is selected from PA 12, PA 6.6, PA 6.10 and PA 6.12.

In another embodiment, the polyamide (b) in the embodiment 1 is a mixture of the polyamides described herein.

In still another embodiment, the polyamide (b) in the embodiment 1 further comprises a reinforcing agent. Suitable reinforcing agent is selected from metal fiber, metalized inorganic fiber, metalized synthetic fiber, glass fiber, polyester fiber, polyamide fiber, polyvinyl alcohol fiber, aramid fiber, graphite fiber, carbon fiber, ceramic fiber, mineral fiber, basalt fiber, inorganic fiber, aramid fiber, kenaf fiber, jute fiber, flax fiber, hemp fiber, cellulosic fiber, sisal fiber and coir fiber.

For the purpose of the present invention, the reinforcing agent can be obtained in any shape and size. Further, the reinforcing agent can be subjected to suitable surface treating agent or sizing. For instance, the reinforcing agent can be subjected to surface treatment using coupling agents such as, but not limited to, urethane coupling agent and epoxy coupling agent. Any suitable techniques for surface treatment can be used for this purpose. For instance, any suitable coating process, such as but not limited to, dip coating and spray coating can be employed.

In one embodiment, the urethane coupling agent comprises at least one urethane group. Suitable urethane coupling agents for use with the reinforcing agents are known to the person skilled in the art, as for instance described in US pub. no. 2018/0282496. In one embodiment, the urethane coupling agent comprises, for example, a reaction product of an isocyanate, such as but not limited to, m-xylylene diisocyanate (XDI), 4,4'-methylenebis(cyclohexyl isocyanate) (HMDI) or isophorone diisocyanate (IPDI), and a polyester based polyol or a polyether based polyol.

In other embodiment, the epoxy coupling agent comprises at least one epoxy group. Suitable epoxy coupling agents for use with reinforcing agents are known to the person skilled in the art, as for instance described in US pub. no. 2015/0247025 incorporated herein by reference. In one embodiment, the epoxy coupling agent is selected from aliphatic epoxy coupling agent, aromatic epoxy coupling agent or mixture thereof. Non-limiting example of aliphatic coupling agent includes a polyether polyepoxy compound having two or more epoxy groups in a molecule and/or polyol polyepoxy compound having two or more epoxy groups in a molecule. As aromatic coupling agent, a bisphenol A epoxy compound or a bisphenol F epoxy compound can be used.

Suitable amounts of these coupling agents, as described herein, are well known to the person skilled in the art. However, in one embodiment, the coupling agent can be present in an amount of 0.1 parts by mass to 10.0 parts by mass relative to 100 parts by mass of the reinforcing agent.

The amount of the polyamide (b) in the embodiment 1, as described herein, is in between 1.0 wt.-% to 50 wt.-%, based on the total weight of the polyamide composition. In one embodiment, the amount is in between 1.0 wt.-% to 48 wt.-%, or 1.5 wt.-% to 48 wt.-%, or 1.5 wt.-% to 46 wt.-%, or 2.0 wt.-% to 46 wt.-%, or 2.0 wt.-% to 44 wt.-%. In other embodiment, the amount is in between 2.5 wt.-% to 44 wt.-%, or 2.5 wt.-% to 42 wt.-%, or 3.0 wt.-% to 42 wt.-%, or 3.5 wt.-% to 42 wt.-%, or 4.0 wt.-% to 42 wt.-%. In another embodiment, the amount is in between 4.0 wt.-% to 40 wt.-%, or 4.5 wt.-% to 40 wt.-%, or 5.0 wt.-% to 40 wt.-%.

Impact Modifier (c)

Impact modifiers, often also termed rubber or elastomeric polymer, for use in the present invention are, for instance, described in US 2014/0323631 A1 and 2008/0070023 A1. Impact modifiers (c) comprise functional groups capable of reacting with polyamides. The polar functional groups are selected from acid, anhydride, acrylic, methacrylic or epoxy functional groups. Suitable impact modifiers (c) in the embodiment 1 are selected from (i) ethylene polymers and copolymers grafted with carboxylic acid, an anhydride thereof, maleimide or an epoxy compound; and (ii) olefin or acrylic acid or anhydride terpolymers and ionomers.

In the ethylene polymers and copolymers grafted with carboxylic acid, anhydride thereof, maleimide or epoxy compound, the carboxylic acid or anhydride thereof is selected from maleic acid, fumaric acid, itaconic acid, acrylic acid, crotonic acid, a $C_1$ to $C_4$ alkyl half ester of maleic acid and their anhydrides or derivatives, including maleic anhydride. Also, olefinic rubbers can also be used as suitable impact modifiers (c).

In one embodiment, the impact modifiers (c) are ethylene copolymers grafted with a carboxylic acid or any anhydride thereof, such as an ethylene copolymer grafted with maleic anhydride. In other embodiment, the impact modifiers (c) include maleic anhydride grafted ethylene propylene diene terpolymer (EPDM) (maleic anhydride in between 2.0 wt.-% to 6.0 wt.-%); ethylene propylene grafted with maleic anhydride (maleic anhydride in between 0.5 wt.-% to 6 wt.-%); maleic anhydride grafted low density polyethylene (maleic anhydride in between 0.2 wt.-% to 6.0 wt.-%); and ethylene butyl acrylate grafted with maleic anhydride (maleic anhydride in between 0.2 wt.-% to 6.0 wt.-%).

The olefin or acrylic acid or anhydride terpolymer and ionomer impact modifiers have polymerized in-chain units derived from the monomers comprising: (a) ethylene, butylene, propylene and combinations thereof; (b) in between 2 wt.-% to 25 wt.-% of an acid selected from acrylic acid, methacrylic acid, and mixtures thereof; and (c) 0.1 wt.-% to 15 wt.-% of a dicarboxylic acid monomer selected from maleic acid, fumaric acid, itaconic acid, maleic anhydride, itaconic anhydride, a $C_1$ to $C_4$ alkyl half ester of maleic acid, and a mixture of these dicarboxylic acid monomers. In one embodiment, the terpolymer is an ethylene/methacrylic acid/maleic anhydride ionomer (in between 0.5 wt.-% to 12 wt.-% maleic anhydride). The ionomer can be formed by neutralization of carboxylic acid units in the terpolymer with metal ions selected from zinc, magnesium, manganese and mixtures thereof, alone or in combination with sodium or lithium ions. The terpolymer may further include up to 40 wt.-% of $C_1$ to $C_8$ alkyl acrylate monomer units.

The impact modifier (c) in the embodiment 1, as described herein, is present in an amount in between 0.01 wt.-% to 15 wt.-%, based on the total weight of the polyamide composition.

In one embodiment, the amount of the impact modifier (c) in the embodiment 1 is in between 0.01 wt.-% to 15 wt.-%, or 0.1 wt.-% to 15 wt.-%, 1.0 wt.-% to 15 wt.-%, 2.0 wt.-% to 15 wt.-%. In other embodiment, the amount is in between 2.0 wt.-% to 14 wt.-%, 3.0 wt.-% to 14 wt.-%, or 4.0 wt.-% to 14 wt.-%, or 5.0 wt.-% to 14 wt.-%, 5.0 wt.-% to 13 wt.-%. In another embodiment, the amount is in between 6.0 wt.-% to 13 wt.-%, or 7.0 wt.-% to 13 wt.-%, or 8.0 wt.-% to 13 wt.-%, or 8.0 wt.-% to 12 wt.-%, or 8.0 wt.-% to 11 wt.-%, or 9.0 wt.-% to 11 wt.-%.

In one embodiment, the impact modifier (c) in the embodiment 1 has a glass transition temperature below 0° C., or below −20° C.

Additives (d)

Suitable additives (d) in the embodiment 1 are selected from plasticizers, antioxidants, stabilizers, nucleating agents, dyes, pigments, flame retardants, lubricants, UV absorbers, antistats, fungistats, bacteriostats, IR absorbing materials, surfactants, hydrolysis controlling agents, curing agents and cell regulators. Mixture of these additives (d) can also be used to obtain the polyamide composition of embodiment 1.

In one embodiment, the additives (d) in the embodiment 1 are selected from plasticizers, antioxidants, stabilizers, nucleating agents, dyes, pigments, flame retardants, lubricants, UV absorbers, antistats, fungistats, bacteriostats and IR absorbing materials.

These additives (d) are well known in the prior art and have been described in many applications. Further, suitable amounts of these additives (d) are well known to a person skilled in the art. In one embodiment, the amount of the additives (d) in the embodiment 1 is in between 0.01 wt.-% to 10 wt.-% based on the total weight of the polyamide composition.

In other embodiment, the amount of the additive (d) in the embodiment 1 is in between 0.01 wt.-% to 15 wt.-%, or 0.1 wt.-% to 15 wt.-%, 1.0 wt.-% to 15 wt.-%, 2.0 wt.-% to 15 wt.-%. In other embodiment, the amount is in between 2.0 wt.-% to 14 wt.-%, 3.0 wt.-% to 14 wt.-%, or 4.0 wt.-% to 14 wt.-%, or 5.0 wt.-% to 14 wt.-%, 5.0 wt.-% to 13 wt.-%. In another embodiment, the amount is in between 6.0 wt.-% to 13 wt.-%, or 7.0 wt.-% to 13 wt.-%, or 8.0 wt.-% to 13 wt.-%, or 8.0 wt.-% to 12 wt.-%, or 8.0 wt.-% to 11 wt.-%, or 9.0 wt.-% to 11 wt.-%.

Process

Another aspect of the present invention is embodiment 2, directed to a process for preparing the polyamide composition of the embodiment 1, as described herein.

In one embodiment, mixing of the polyamide copolymer (a), the polyamide (b), the impact modifier (c) and the additive (d) is carried out in the embodiment 2. Suitable techniques for mixing are well known to the person skilled in the art. For instance, the polyamide composition of the embodiment 1, as described herein, can be subjected to mixing in the molten state in a single or double screw extruder. In other embodiment, ingredients (a), (b), (c) and (d) in the embodiment 2 can be mixed in any sequence.

Shaped Article

Another aspect of the present invention is embodiment 3, directed to a shaped article comprising the polyamide composition of the embodiment 1 or as obtained according to the embodiment 2, as described herein.

In one embodiment, the shaped article in the embodiment 3 can be obtained by shaping the polyamide composition of the embodiment 1 or as obtained according to the embodiment 2, as described herein. Suitable shaping techniques include, such as but not limited to, moulding, extrusion and extrusion blow-moulding.

In another embodiment, the shaped article in the embodiment 3 can be, for example, air brake tube, air conditioning tube, pneumatic pipe and fuel pipe. These examples of the shaped articles are given only by way of indication but correspond to the components requiring good $ZnCl_2$ resistance, low fuel permeability, resistance to fuel, high mechanical and flexibility properties.

Use

Another aspect of the present invention is embodiment 4, directed to the use of the polyamide composition of embodiment 1 or as obtained according to embodiment 2, as described herein, for shaped article. The shaped article in the embodiment 4 is the shaped article of the embodiment 3, as described herein.

Tubular or Pipe Multilayer Structure

Yet another aspect of the present invention is embodiment 5, directed to a tubular or pipe multilayer structure comprising an innermost layer, a middle layer and an outermost layer, wherein the innermost layer and the outermost layer, independent of one another, comprises the polyamide copolymer (a), and wherein the middle layer comprises the polyamide (b). The impact modifier (c) and the additive (d) are present in at least one of the innermost layer, middle layer and the outermost layer. The layers of the tubular or pipe multilayer structure in the embodiment 5 comprise of the polyamide composition comprising (a), (b), (c) and (d) of the embodiment 1, as described herein.

In the present context, the term "multilayer" refers to the presence of at least 3 layers in the embodiment 5. In one embodiment, the tubular or pipe multilayer structure can comprise more than 3 layers, for example, 4, 5, 6 or 7 layers. Such layers can be referred to as intermediate layers. Some of these intermediate layers are advantageously formed from a composition identical to the one forming the outermost layer. These layers will be referred to as external-type intermediate layers. Other intermediate layers are formed from a composition identical to the one forming the innermost layer. Such layers will be referred to as internal-type intermediate layers.

In one embodiment, the internal-type intermediate layers and the external-type intermediate layers are arranged alternately in the transverse direction of the tubular or pipe multilayer structure in the embodiment 5.

Furthermore, without departing from the scope of the invention, the tubular or pipe multilayer structure in the embodiment 5 can comprise intermediate layers made from a composition other than the polyamide composition of the embodiment 1, as described herein.

Another aspect of the present invention is embodiment 6, directed to a tubular or pipe multilayer structure consisting of an innermost layer, a middle layer and an outermost layer, wherein the innermost layer and the outermost layer, independent of one another, comprises the polyamide copolymer (a), and wherein the middle layer comprises the polyamide (b). The impact modifier (c) and the additive (d) are present in at least one of the innermost layer, middle layer and the outermost layer. The layers of the tubular or pipe multilayer structure in the embodiment 5 comprise of the polyamide composition comprising (a), (b), (c) and (d) of the embodiment 1, as described herein.

In another embodiment, the tubular or pipe multilayer structure in the embodiment 5 or 6 has an opening at each end thereof. Suitable diameter of the opening depend on the specific use of these tubular or pipe multilayer structure and are therefore, well known to the person skilled in the art.

In other embodiment, the innermost layer in the embodiment 5 or 6 is in direct contact with the middle layer. Said otherwise, the innermost layer, as described herein, has a good adhesion with the middle layer, as described herein. In the present context, "good adhesion" implies the absence of delamination in the layers.

In yet another embodiment, the middle layer in the embodiment 5 or 6 is in direct contact with the outermost layer. Said otherwise, the middle layer is in between the innermost layer and the outermost layer and has good adhesion with both the layers.

In one embodiment, the thickness of the innermost layer in the embodiment 5 or 6 is in between 0.05 mm to 5.0 mm, or 0.05 mm to 4.5 mm, or 0.06 mm to 4.5 mm, or 0.06 mm to 4.0 mm, or 0.07 mm to 4.0 mm, or 0.07 mm to 3.5 mm. In other embodiment, the thickness is in between 0.08 mm to 3.5 mm, or 0.08 mm to 3.0 mm, or 0.1 mm to 3.0 mm, or 0.1 mm to 2.0 mm. In other embodiment, the thickness is in between 0.12 mm to 2.0 mm, 0.12 mm to 1.5 mm, or 0.15 mm to 2.0 mm, or 0.15 mm to 1.5 mm, or 0.15 mm to 1.0 mm. In still other embodiment, the thickness is in between 0.2 mm to 1.0 mm, or 0.2 mm to 0.5 mm.

In other embodiment, the thickness of the middle layer in the embodiment 5 or 6 is in between 1 mm to 20 mm, or 2 mm to 20 mm, or 2 mm to 18 mm, or 5 mm to 18 mm, or 5 mm to 15 mm. In other embodiment, the thickness is in between 6 mm to 15 mm, or 6 mm to 13 mm, or 7 mm to 13 mm, or 7 mm to 12 mm, or 8 mm to 12 mm.

In another embodiment, the thickness of the outermost layer in the embodiment 5 or 6 is in between 0.05 mm to 5.0 mm, or 0.05 mm to 4.5 mm, or 0.06 mm to 4.5 mm, or 0.06 mm to 4.0 mm, or 0.07 mm to 4.0 mm, or 0.07 mm to 3.5 mm. In other embodiment, the thickness is in between 0.08 mm to 3.5 mm, or 0.08 mm to 3.0 mm, or 0.1 mm to 3.0 mm, or 0.1 mm to 2.0 mm. In other embodiment, the thickness is in between 0.12 mm to 2.0 mm, 0.12 mm to 1.5 mm, or 0.15 mm to 2.0 mm, or 0.15 mm to 1.5 mm, or 0.15 mm to 1.0 mm. In still other embodiment, the thickness is in between 0.2 mm to 1.0 mm, or 0.2 mm to 0.5 mm.

In yet another embodiment, the tubular or pipe multilayer structure in the embodiment 5 or 6 has a cylindrical or non-cylindrical shape. These shapes are generally manufactured by using techniques such as, but not limited to, co-extruding of the polyamide composition of the embodiment 1, as described herein. One such technique is, for example, described in EP 0 436 923 B2.

Advantageously, the tubular or pipe multilayer structure in the embodiment 5 or 6 shows acceptable $ZnCl_2$ resistance for 200 h duration, has acceptable mechanical properties, such as but not limited, to flexural modulus, tensile modulus and elongation at break without any delamination.

In one embodiment, the tubular or pipe multilayer structure in the embodiment 5 or 6 has a tensile modulus of at least 90 MPa determined according to ISO 527-1 at 23° C. In other embodiment, the tensile modulus is in between 200 MPa to 1200 MPa, or 400 MPa to 1000 MPa, or 600 MPa to 900 MPa.

In another embodiment, the tubular or pipe multilayer structure in the embodiment 5 or 6 has an Izod notched impact resistance at 23° C. of at least 40 kJ/m$^2$ determined according to ISO 180/A.

In view of the above advantages the tubular or pipe multilayer structure of the embodiment 5 or 6 is suitable for producing inexpensive air brake tube, air conditioning tube, pneumatic pipe and fuel pipe.

The present invention is illustrated in more detail by the following embodiments and combinations of embodiments which result from the corresponding dependency references and links:

I. A polyamide composition comprising:
 (a) a polyamide copolymer obtained by reacting
  (i) ε-caprolactam, and
  (ii) a mixture of hexamethylenediamine with a diacid comprising at least 9 carbon atoms,
   wherein the weight ratio between (i) and (ii) is in between 1.0:1.0 to 3.0:1.0,
 (b) at least one polyamide which is different from (a),
 (c) at least one impact modifier, and
 (d) additives.

II. The polyamide composition according to embodiment I, wherein the amount of the polyamide copolymer (a) is in between 40 wt.-% to 90 wt.-%, based on the total weight of the polyamide composition.

III. The polyamide composition according to embodiment I or II, wherein the diacid comprises 9 to 40 carbon atoms.

IV. The polyamide composition according to one or more of embodiments I to III, wherein the diacid comprises 36 carbon atoms.

V. The polyamide composition according to one or more of embodiments I to IV, wherein the weight ratio between (i) and (ii) is in between 2.0:1.0 to 3.0:1.0.

VI. The polyamide composition according to one or more of embodiments I to V, wherein the weight ratio between (i) and (ii) is in between 2.0:1.0 to 2.5:1.0.

VII. The polyamide composition according to one or more of embodiments I to VI, wherein the amount of the polyamide (b) is in between 1.0 wt.-% to 50 wt.-%, based on the total weight of the polyamide composition.

VIII. The polyamide composition according to one or more of embodiments I to VII, wherein the amount of the polyamide (b) is in between 5.0 wt.-% to 40 wt.-%, based on the total weight of the polyamide composition.

IX. The polyamide composition according to one or more of embodiments I to VIII, wherein the at least one impact modifier is selected from (i) ethylene polymers and copolymers grafted with carboxylic acid, an anhydride thereof, maleimide or an epoxy compound, and (ii) olefin or acrylic acid or anhydride terpolymers and ionomers.

X. The polyamide composition according to one or more of embodiments I to IX, wherein the amount of the impact modifier (c) is in between 0.01 wt.-% to 15 wt.-%, based on the total weight of the polyamide composition.

XI. The polyamide composition according to one or more of embodiments I to X, wherein the amount of the impact modifier (c) is in between 7 wt.-% to 13 wt.-%, based on the total weight of the polyamide composition.

XII. The polyamide composition according to one or more of embodiments I to X, wherein the additives (d) are selected from plasticizers, antioxidants, stabilizers, nucleating agents, dyes, pigments, flame retardants, lubricants, UV absorbers, antistats, fungistats, bacteriostats and IR absorbing materials.

XIII. The polyamide composition according to one or more of embodiments I to XII, wherein the amount of the additives (d) is in between 0.01 wt.-% to 15 wt.-% based on the total weight of the polyamide composition.

XIV. A process for preparing a polyamide composition according to one or more of embodiments I to XIII by mixing the polyamide copolymer (a), the polyamide (b), the impact modifier (c) and the additives (d).

XV. A shaped article comprising the polyamide composition according to one or more of embodiments I to XIII or as obtained by the process according to embodiment 14.

XVI. Use of the polyamide composition according to one or more of embodiments I to XIII or as obtained by the process according to embodiment XIV, for a shaped article.

XVII. The use according to embodiment XVI, wherein the shaped article is obtained by moulding, extrusion and blow-moulding.

XVIII. A tubular or pipe multilayer structure comprising an innermost layer, a middle layer and an outermost layer, wherein the innermost layer and the outermost layer, independent of one another, comprises
 (a) a polyamide copolymer obtained by reacting
  (i) ε-caprolactam, and
  (ii) a mixture of hexamethylenediamine with a diacid comprising at least 9 carbon atoms, wherein the weight ratio between (i) and (ii) is in between 1.0:1.0 to 3.0:1.0,
 wherein the middle layer comprises
 (b) at least one polyamide which is different from (a), and
  wherein at least one impact modifier (c) and additives (d) are present in at least one of the innermost layer, the middle layer and the outermost layer.

XIX. The structure according to embodiment XVIII, wherein the tubular or pipe multilayer structure has an opening at each end thereof.

XX. The structure according to embodiment XVIII or XVIX, wherein the innermost layer is in direct contact with the middle layer.

XXI. The structure according to one or more of embodiments XVIII to XX, wherein the middle layer is in direct contact with the outermost layer.

XXII. The structure according to one or more of embodiments XVIII to XXI, wherein the weight ratio between (i) and (ii) is in between 2.0:1.0 to 3.0:1.0.

XXIII. The structure according to one or more of embodiments XVIII to XXII, wherein the weight ratio between (i) and (ii) is in between 2.0:1.0 to 2.5:1.0.

XXIV. The structure according to one or more of embodiments XVIII to XXIII, wherein the thickness of the innermost layer is in between 0.05 mm to 5.0 mm.

XXV. The structure according to one or more of embodiments XVIII to XXIV, wherein the thickness of the middle layer is in between 1 mm to 20 mm.

XXVI. The structure according to one or more of embodiments XVIII to XXV, wherein the thickness of the outermost layer is in between 0.05 mm to 5.0 mm.

XXVII. The structure according to one or more of embodiments XVIII to XXVI having a tensile modulus of at least 90 MPa determined according to ISO 527-1 at 23° C. and an Izod notched impact resistance at 23° C. of at least 40 kJ/m² determined according to ISO 180/A.

XXVIII. The structure according to one or more of embodiments XVIII to XXVII, which is capable of meeting the requirement of stress cracking resistance measured in $ZnCl_2$ solution in accordance with SAE J844 for 200 h duration.

XXIX. The structure according to one or more of embodiments XVIII to XXVIII wherein the structure is selected from an air brake tube, air conditioning tube and a fuel pipe.

EXAMPLES

The presently claimed invention is illustrated by the non-restrictive examples which are as follows:

| Compounds | |
|---|---|
| Polyamide | |
| P1 | Polyamide 6.12, obtained from Arkema |
| P2 | Polyamide 6.10, obtained from Arkema |
| P3 | Polyamide 66 having a viscosity number in between 142 ml/g to 158 ml/g determined according to ISO 307, obtained from BASF |
| Impact modifier | |
| IM1 | Ethylene-methacrylic acid copolymer, obtained from DuPont |
| IM2 | Anhydride modified ethylene copolymer, obtained from DuPont |
| Additive | |
| A1 | N-butylbenzosulfonamide, obtained from Lanxess Deutschland GmbH |
| A2 | Sodium stearate, obtained from Sigma Aldrich |
| A3 | Tris(2,4-diter-butylphenyl)phosphite, obtained from BASF |
| A4 | N,N'-hexane-1,6-diylbis(3-(3,5-di-tert.-butyl-4-hydroxyphenylpropionamide), obtained from BASF |
| Standard methods | |
| Tensile modulus | ISO 527-1 |
| Izod notched impact strength | ISO 180/A |
| Viscosity number | ISO 307 |

$ZnCl_2$ Resistance

The stress cracking resistance in $ZnCl_2$ solution was determined using the procedure described in international standard SAE J844 issued in June 1963 and revised on 12 Jun. 1990. This test consists in giving a tube of inner diameter 6 mm and outer diameter 8 mm, extruded with the composition to be tested, a specific radius of curvature and immersing the tube thus curved in a cool solution with 50 wt.-% $ZnCl_2$ for 200 h at 24° C. The tube was considered to have passed the test, if upon removing the tube from the solution, no cracks were observed on its external surface.

Polyamide Copolymer (PC) (Ratio (i):(ii) of 2.3:1)

A copolyamide of PA 6 and PA 6.36 was prepared by the following method:

932 kg of ε-caprolactam, 323.2 kg of hydrogenated $C_{36}$ dimer acid from Croda and 77.84 kg of 85% by weight hexamethylenediamine solution in water and 153 kg of water were mixed in a 1930 L tank and blanketed with nitrogen. The outside temperature of the tank was heated to 290° C. and the mixture was stirred at this temperature for 11 hours. In the first 7 h, the mixture was stirred at elevated pressure, in the next 4 hours under reduced pressure, during which water formed was distilled off. The copolyamide obtained was discharged from the tank, extruded and pelletized. The pellets of the copolyamide obtained were extracted with water at 95° C. for 4-6 hours and then dried at 90° C. to 140° C. in a nitrogen stream for 10 hours. The copolyamide obtained had a viscosity number of 259 mL/g, a glass transition temperature of 38° C. and a melting temperature of 188° C. The proportion of polyamide 6.36 in the copolyamide, based on the total weight of the copolyamide, was 30% by weight; the density was 1.076 g/ml.

TABLE 1

| Inventive polyamide compositions | | | |
|---|---|---|---|
| Ingredients | IE 1 | IE 2 | IE 3 |
| PC | 81.8 | 64.8 | 43.8 |
| P1 | — | 20.0 | — |
| P2 | — | — | 40.0 |
| P3 | 5.0 | — | — |
| IM1 | 5.0 | 5.0 | 5.0 |
| IM2 | 5.0 | 5.0 | 5.0 |

TABLE 1-continued

| Inventive polyamide compositions | | | |
|---|---|---|---|
| Ingredients | IE 1 | IE 2 | IE 3 |
| A1 | 2.0 | 4.0 | 5.0 |
| A2 | 0.2 | 0.2 | 0.2 |
| A3 | 0.5 | 0.5 | 0.5 |
| A4 | 0.5 | 0.5 | 0.5 |

General Synthesis of Multi-Layered Pipe Structure

A single screw extruder was used for the tube extrusion process. For multilayer tubes, two or more extruders were combined to feed the polymer for each layer into a multilayer tube die. The extruded tube was then pulled into a cooling bath after exiting the die. The bath solidified the tube and dimensional control could then be achieved. Once solidified, a cutting machine was used to cut the tube into a desirable length.

Several three-layered pipe structures were obtained and tested for their mechanical properties, the results of which are summarized in Table 2 below.

TABLE 2

Properties of the multi-layered pipe structure

| Properties | IE 1 | IE 2 | IE 3 |
|---|---|---|---|
| Tensile strength at break (in MPa) | 36 | 40 | 37 |
| Nominal strain at break (in MPa) | 170 | 188 | 191 |
| Tensile modulus (in MPa) | 617 | 824 | 689 |
| Flexural modulus (in MPa) | 633 | 722 | 502 |
| Izod notched impact strength at 23° C. (in kJ/m$^2$) | 79 | 72 | 105 |
| Izod notched impact strength at −40° C. (in kJ/m$^2$) | 8.8 | 7 | 7.4 |
| Melt flow rate (g/10 min) | 11 | 11 | 23 |
| ZnCl$_2$ resistance (for 200 h) | No Crack | No Crack | No Crack |

As evident above, the multi-layered pipe structures according to the invention do not result in any ZnCl$_2$ resistance (for 200 h). In fact, the composition with lower amounts of polyamide (b) i.e. IE 1, show properties similar to those of IE 2 and IE 3. Moreover, there is no delamination observed in any of the inventive compositions.

Polyamide copolymers (comparative), similar to U.S. Pat. No. 6,060,562 A, were prepared as described above, but with ratio (i):(ii) of 4.0:1.0 (CE 1) and 9.0:1.0 (CE 2). ZnCl$_2$ resistance (for 200 h) for CE 1 and CE 2 was tested as described above, the results of which are summarized in Table 3 below.

TABLE 3

ZnCl$_2$ resistance for inventive and comparative examples

| Ingredients | IE 1 | CE 1 | CE 2 |
|---|---|---|---|
| PC | 81.8 | 81.8 | 81.8 |
| P1 | — | — | — |
| P2 | — | — | — |
| P3 | 5.0 | 5.0 | 5.0 |
| IM1 | 5.0 | 5.0 | 5.0 |
| IM2 | 5.0 | 5.0 | 5.0 |
| A1 | 2.0 | 2.0 | 2.0 |
| A2 | 0.2 | 0.2 | 0.2 |
| A3 | 0.5 | 0.5 | 0.5 |
| A4 | 0.5 | 0.5 | 0.5 |
| ZnCl$_2$ resistance | | | |
| ZnCl$_2$ resistance (for 200 h) | No Crack/passed | Cracked/failed | Cracked/failed |

As evident above, the three-layered pipe structure obtained using IE 1 was ZnCl$_2$ resistant for 200 h, while those obtained using CE 1 and CE 2 failed the test. Thus, the present invention composition could be used for obtaining inexpensive air brake tube, air conditioning tube, pneumatic pipe and fuel pipe which are ZnCl$_2$ resistant (for 200 h) and have acceptable mechanical properties, as shown above.

The invention claimed is:
1. A polyamide composition, comprising:
(a) a polyamide copolymer obtained by reacting
 (i) ε-caprolactam, and
 (ii) a mixture of hexamethylenediamine with a diacid comprising at least 9 carbon atoms,
  wherein the weight ratio between (i) and (ii) is in between 1.0:1.0 to 3.0:1.0,
(b) at least one polyamide which is different from (a),
(c) at least one impact modifier having a glass transition temperature below 0° C., and
(d) additives
wherein the impact modifier is selected from (i) ethylene-methacrylic acid copolymer, (ii) ethylene polymers and copolymers grafted with an epoxy compound, and (iii) olefin or acrylic acid or anhydride terpolymers.

2. The polyamide composition according to claim 1, wherein the diacid comprises 9 to 40 carbon atoms.

3. The polyamide composition according to claim 1, wherein the diacid comprises 36 carbon atoms.

4. The polyamide composition according to claim 1, wherein the weight ratio between (i) and (ii) is in between 2.0:1.0 to 3.0:1.0.

5. The polyamide composition according to claim 1, wherein the additives (d) are at least one selected from the group consisting of plasticizers, antioxidants, stabilizers, nucleating agents, dyes, pigments, flame retardants, lubricants, UV absorbers, antistats, fungistats, bacteriostats and IR absorbing materials.

6. A process for preparing a polyamide composition according to claim 1, the process comprising mixing the polyamide copolymer (a), the polyamide (b), the impact modifier (c) and the additives (d).

7. A shaped article, comprising the polyamide composition according to claim 1.

8. A method of using the polyamide composition according to claim 1, the method comprising using the polyamide composition for a shaped article.

9. The method of using according to claim 8, wherein the shaped article is obtained by moulding, extrusion and blow-moulding.

10. The polyamide composition according to claim 1, wherein said at least one impact modifier has a Tg below −20° C.

11. A tubular or pipe multilayer structure, comprising an innermost layer, a middle layer and an outermost layer, wherein the innermost layer and the outermost layer, independent of one another, comprises
(a) a polyamide copolymer obtained by reacting
 (i) ε-caprolactam, and
 (ii) a mixture of hexamethylenediamine with a diacid comprising at least 9 carbon atoms, wherein the weight ratio between (i) and (ii) is in between 1.0:1.0 to 3.0:1.0,
wherein the middle layer comprises
(b) at least one polyamide which is different from (a), and
wherein at least one impact modifier (c) having a glass transition temperature below 0° C. and additives (d) are present in at least one of the innermost layers, the middle layer and the outermost layer.

12. The structure according to claim 11, wherein the tubular or pipe multilayer structure has an opening at each end thereof.

13. The structure according to claim 11, having a tensile modulus of at least 90 MPa determined according to ISO 527-1 at 23° C. and an Izod notched impact resistance at 23° C. of at least 40 KJ/m$^2$ determined according to ISO 180/A.

14. The structure according to claim 11, which is capable of meeting a requirement of stress cracking resistance measured in ZnCl$_2$ solution in accordance with SAE J844 for 200 h duration.

15. The structure according to claim 11, wherein the structure is selected from the group consisting of an air brake tube, air conditioning tube and a fuel pipe.

* * * * *